United States Patent [19]
Liskow

[11] Patent Number: 5,643,049
[45] Date of Patent: Jul. 1, 1997

[54] FLOATING CONTACT GAGE FOR MEASURING CYLINDRICAL WORKPIECES EXITING A GRINDER

[75] Inventor: Karl J. Liskow, Ypsilanti, Mich.

[73] Assignee: Control Gaging, Inc., Ann Arbor, Mich.

[21] Appl. No.: 509,436

[22] Filed: Jul. 31, 1995

[51] Int. Cl.$^6$ ............................ B24B 49/03; G01B 5/10
[52] U.S. Cl. ........................ 451/10; 33/504; 451/11; 451/22; 451/184; 451/242; 451/245; 451/407
[58] Field of Search ........................ 340/680; 451/8, 451/10, 22, 11, 49, 130, 142, 184, 242, 245, 336, 397, 407, 424; 33/504, 501.06, 501.07, 501.02, 501.03, 501.04, 558.01, 558, 558.04, 558.2, 560

[56] References Cited

U.S. PATENT DOCUMENTS

| | | |
|---|---|---|
| 1,225,858 | 5/1917 | Raule ........................................ 451/10 |
| 2,281,817 | 5/1942 | Asbridge .................................... 451/10 |
| 2,394,475 | 2/1946 | Pierce, Jr. ................................. 451/10 |
| 2,949,708 | 8/1960 | Wiatt et al. .......................... 451/242 X |
| 3,001,336 | 9/1961 | Bauer ................................. 451/242 X |
| 4,055,027 | 10/1977 | Freddi ............................... 451/407 X |
| 4,580,370 | 4/1986 | Smith ................................ 451/245 X |
| 4,625,429 | 12/1986 | Danielli ................................... 33/504 |

*Primary Examiner*—Timothy V. Eley
*Attorney, Agent, or Firm*—Harness, Dickey & Pierce, P.L.C.

[57] ABSTRACT

A gage for a thrufeed centerless grinder for post process gaging of a work piece in which the gage is mounted for movement so as to track along a moving work piece as it is moved along a path of travel from the grinder. The gage is movable in two directions mutually orthogonal to the path of travel of the work piece as it exits the grinder so as to track along the cross-section of the moving work piece enabling the gage to measure the work piece diameter. Movement of the gage is provided for by rotation about two axes wherein the gage motion is an arcuate direction having substantial vector components in the mutual orthogonal directions to the work piece path of travel.

12 Claims, 3 Drawing Sheets

5,643,049

FLOATING CONTACT GAGE FOR MEASURING CYLINDRICAL WORKPIECES EXITING A GRINDER

BACKGROUND AND SUMMARY OF THE INVENTION

The present invention relates to a gage for thrufeed centerless grinding and in particular to a floating contact gage which measures work pieces exiting the grinder without the necessity of fixturing the work piece during gaging.

Thrufeed centerless grinding is used for high volume precision grinding of outside diameters of everything from continuous stacks of washer-like pads to long thin rods. There are several advantages to this type of grinding. One advantage is the automatic flow of work pieces through the machine, back to back, as if one long work piece was being ground. Another advantage of thrufeed centerless grinding is the ability to improve the roundness of a work piece as it is being ground to finished size.

During grinding, the work piece is supported by a grinding wheel, a regulating wheel and a work rest blade. This would be a desirable place to locate the gage due to the work piece stability provided by the grinding and regulating wheels and the work rest blade. In addition, the gage output can be used to directly control the grinding operation on the gaged work piece. However, due to these machine elements which provide support to the work piece, it is difficult to use an electronic contact gage. There is simply no room to install a gage at a location that will measure the finished part size while it is still between the regulating and grinding wheels. As a result, most centerless grinding gages are "post process" gages. Finished pads are gaged after they have left the grinder. Here, too, there are several difficulties to be overcome. Most post process gages confine the work piece in a fixture during measurement. However, in a thrufeed centerless grinder, work pieces are constantly moving through the gage while being measured. The accuracy of the gaging process can be seriously compromised by the moving work pieces. The moving work pieces must be stabilized relative to the gage in order to obtain accurate gage readings. The gaging of long rods is particularly difficult as the fixture necessary to stabilize the work pieces must grow in proportion to the length of the work pieces.

Accordingly, it is an object of the present invention to overcome the above problems with post process gaging in a thrufeed centerless grinder.

Manufacturers of long centerless ground work pieces usually employ a belt type conveyer to remove the work pieces from the exit of the grinders as they are finished. The present invention provides a gage which is able to contact these work pieces while they are moving along the belt conveyer without requiring any special stabilizing fixture for the work piece. Instead, the gage itself is stabilized by the work piece, enabling the desired gaging accuracy to be achieved. This is accomplished by allowing the gage to float so that it will track the immediate cross-section of the work piece being measured. Non-fixtured moving part gaging has been previously performed in the context of a non-contact gage. These types of gages include laser scanning and air gaging. Both of these gaging methods have their own drawbacks. In post process gaging, following grinding, debris and coolant fluid often remain on the work pieces and adversely affect the gaging accuracy. With non-contact gages, the relative positioning of the work piece and gage is not as critical as with a contact gage.

The gage of the present invention is mounted to a fixture adjacent to the conveyer carrying the work pieces from the grinder. The fixture has a first portion which is stationary and preferably attached to the conveyer structure. A second fixture portion is rotatably attached to the stationary portion and rotates about an axis which is parallel to the path of travel of the work pieces exiting the grinder. A third fixture portion is rotatably mounted to the second portion for rotation about an axis that is normal to the first axis and normal to the path of travel of the work pieces. This second axis, however, is not in the same plane as either the path of travel or the first axis and does not intersect either the path of travel or the first axis. A contact gage is then mounted to the third fixture portion and is thus movable by rotation with two degrees of freedom to track the immediate cross-section of the work piece being measured.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
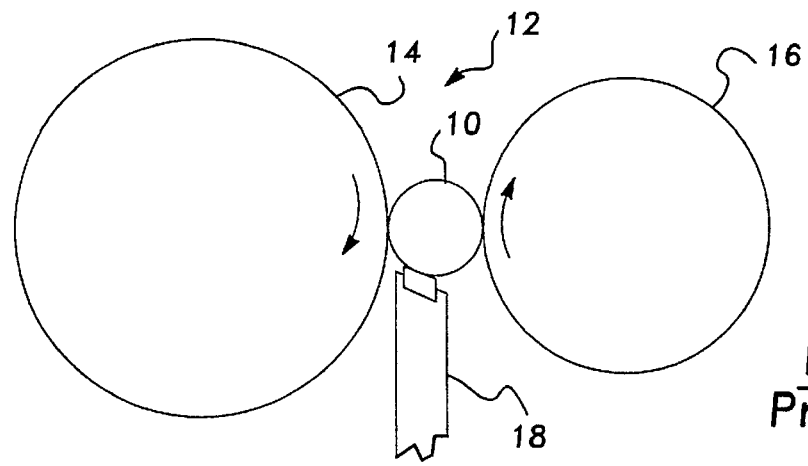
FIG. 1 is a schematic drawing illustrating a thrufeed centerless grinder with the work piece being supported therein.

A cylindrical work piece 10 is shown in FIG. 1 in a thrufeed centerless grinder 12. The grinder 12 includes a pair of wheels, a grinding wheel 14 and a regulating wheel 16. The work piece 10 is positioned between the grinding and regulating wheels and is supported upon a work blade 18. The two wheels and the work blade provide excellent support for the work piece and would be a preferred location to gage the work piece diameter due to this support and the ability to directly control the grinding process by the gage output. However, there is not sufficient room available to mount a gage for diametrical contact with the work piece 10. As a result, gaging of thrufeed centerless ground work pieces is typically performed post process.

Figure 2:
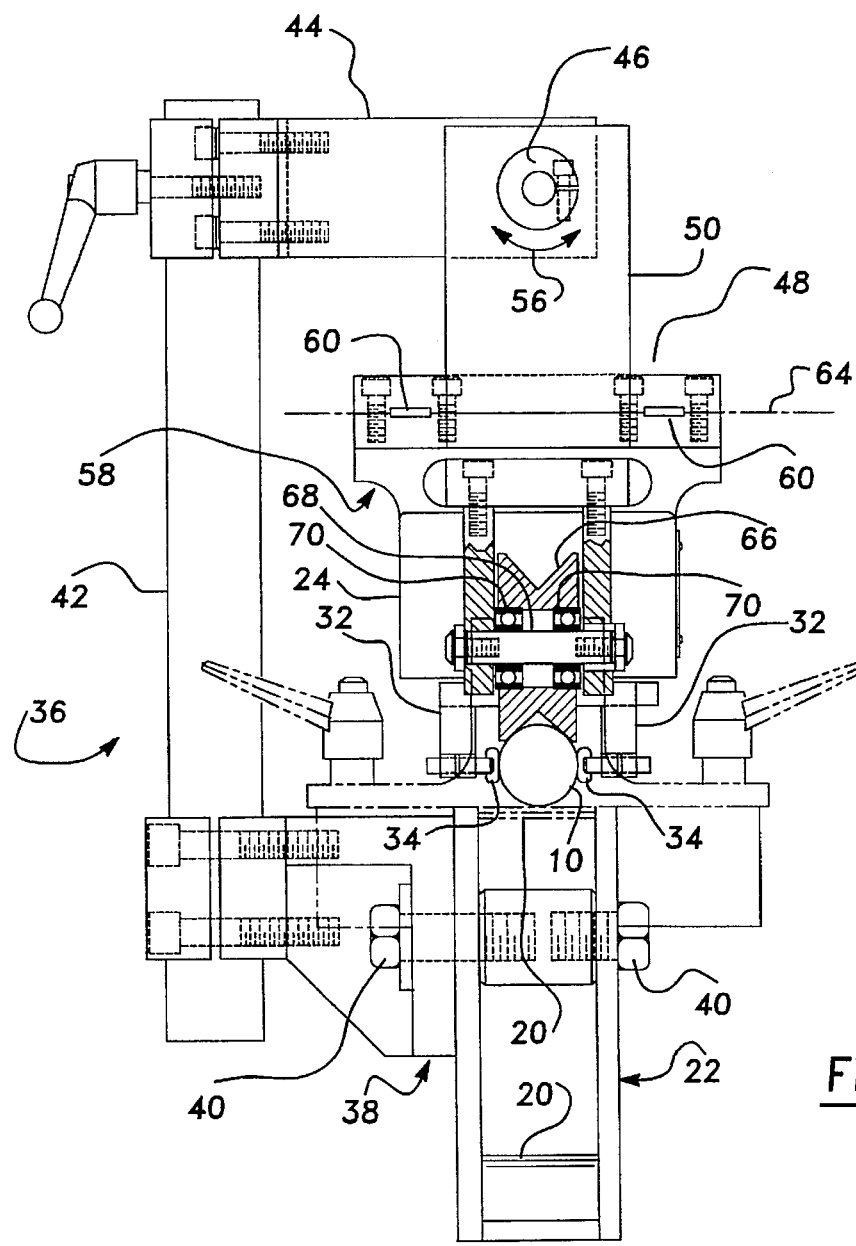
FIG. 2 is a front elevational view of the floating contact gage of the present invention.
Figure 3:
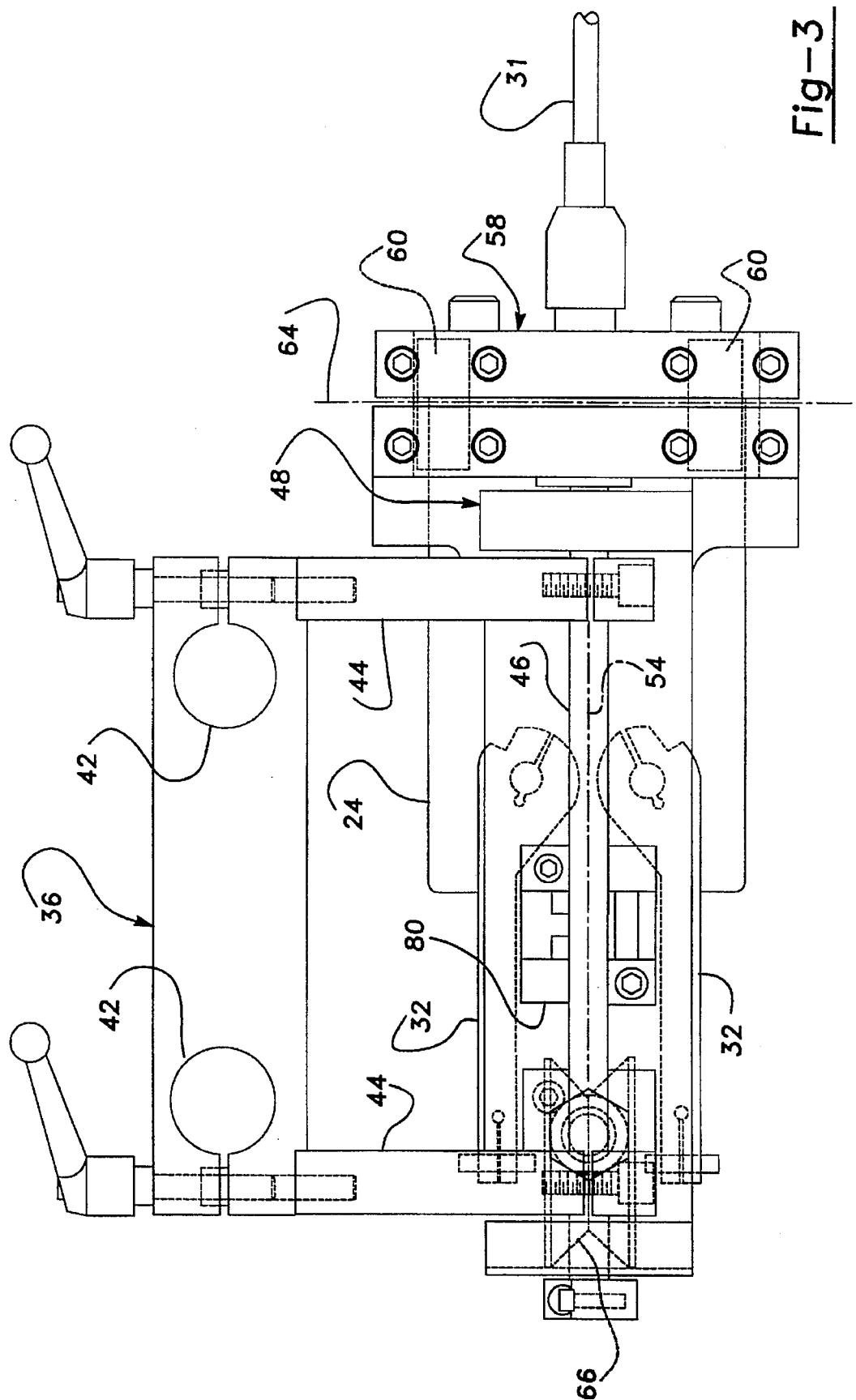
FIG. 3 is a top view of the floating contact gage of the present invention.
Figure 4:
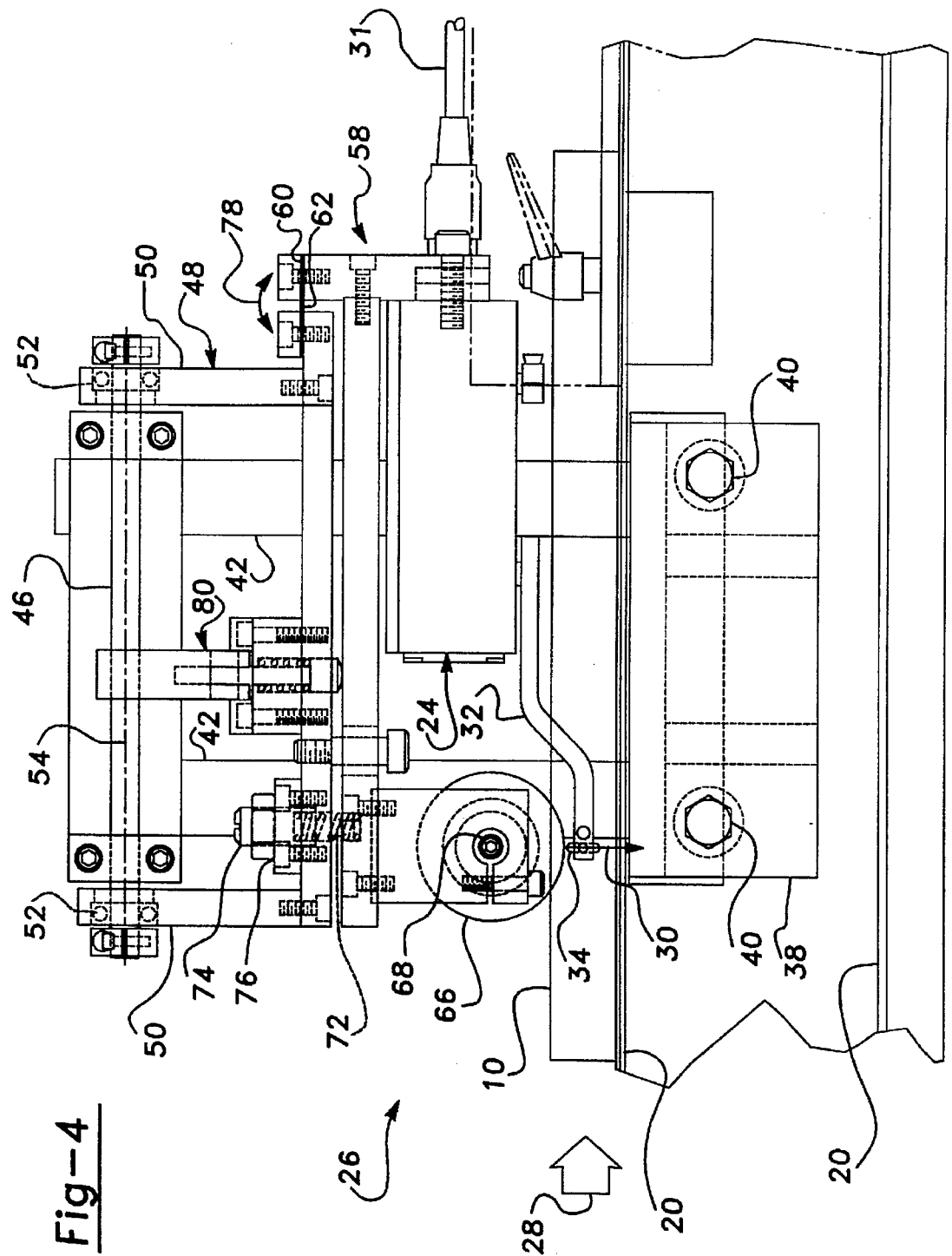
FIG. 4 is a side elevational view of the floating contact gage of the present invention.

The floating contact gage of the present invention is shown in detail in FIGS. 2, 3 and 4. The work piece 10 exits the grinder 12 onto an endless conveyer belt 20. The belt 20 is supported and carried upon a conveyer frame 22. A contact gage 24 is supported by a fixture 26 so as to measure the diameter of the work piece 10 moving along a path of travel shown by the arrow 28 as the work piece exits the grinder 12 on the conveyer. The gage 24 contains a transducer and a means to support a pair of gage arms 32 carrying gage contacts 34 that contact the work piece diameter on opposite sides to measure the work piece diameter. The gage is connected to a controller through a cable 31.

The fixture 26 supports the gage 24 so that the gage can move laterally and vertically to track the work piece 10 as it moves along its path of travel. The fixture includes a stationary portion 36 which is rigidly attached to the conveyer frame 22. The stationary portion includes a bracket 38 that is fixed to the conveyer frame by bolts 40. Coupled to the bracket 38 are a pair of upright columns 42. A pair of cross arms 44 extend from the columns 42 and support a pivot shaft 46 spaced above the endless conveyer 20.

A second fixture portion 48 includes a pair of spaced apart legs 50 which are rotatably mounted to the pivot shaft 46 by bearings 52. The fixture 48 is thus enabled to rotate about the axis 54 of the pivot shaft 46. This axis is substantially parallel to the path of travel of the exiting work piece 10. The rotation of the fixture portion 42 about the axis 54 is shown by the arrow 56 in FIG. 2.

A third fixture portion 58 is attached to the second fixture portion 48 by a pair of flexures 60. The flexures 60 are thin flexible plates having one end fixed to the second fixture portion and the other end fixed to the third fixture portion with a gap 62 therebetween. The gap 62 and the flexible nature of the flexures enable the third fixture portion to rotate about an axis 64 defined by the flexures. The axis 64 extends in a direction normal to the pivot shaft axis 54 and to the path of travel of the work piece 10. The axis 64 does not lie in the plane defined by the axis 54 and path of travel but is rather perpendicular to that plane so as to extend in a direction normal to the axis 54 and to the path of travel.

The gage 24 is attached to the third fixture portion 58. The gage arms 32 extend downward and forward from the gage 24. The contacts 34 are thus positioned along the work piece path of travel where they can engage the work piece on opposite sides to measure diameter.

The third fixture portion 58 also carries a V-shaped roller 66 which rotates about a pivot pin 68 upon a pair of bearings 70. The V-shaped roller is positioned immediately above the contacts 34 of the gage 24. The roller 66 is sized so as to rest upon the work piece 10 while the contacts 34 are measuring the diameter of the work piece upon the conveyer 20.

The V-shaped roller 66 is located at the opposite end of the third fixture portion from the flexures 60. The roller is biased downward against the work piece by a spring 72 placed between the second and third fixture portions and spaced from the flexures 60. The biasing force supplied by the spring 72 is adjustable by the set screw 74 held in place by lock nut 76 on the second fixture portion 48. The flexures 60 enable the fixture portion 58 to rotate about the axis 64 as shown by the arrow 78. This enables the contacts 34 to move in an arcuate direction across the path of travel. This arcuate motion has a significant vector component 30 in the vertical direction. A clamp 80 is provided between the fixture second and third portions. The clamp 80 is used to hold the third portion downward, against a work piece during the gage setup.

The rotation of the second fixture portion about the axis 54 also results in arcuate motion of the contacts 34, as shown by the 56 in FIG. 2. This arcuate motion has a substantial vector component in a horizontal direction, laterally across the path of travel of the work piece. The fixture 26 thus provides the gage 24 with motion in two directions, mutually orthogonal to the path of travel. This enables the gage contacts 34 to track along the cross-section of the work piece 10.

While the motion of the gage contacts 34 is polar motion, the radii of rotation are very large compared to the angular travel over the range of interest. As a result, over this range, the motion of the contact is essentially x-y translation. By moving the gage to track the work piece, the gage is thus held in position by the work piece 10. The gage and work piece are thus fixed in position relative to one another.

The gage of the present invention, by providing two degrees of freedom for the gage contacts, is able to maintain its position on the work piece as the work piece is moving without fixturing or otherwise stabilizing the work piece. This enables one hundred percent gaging of the continuously moving work pieces and provides continuous feedback to the grinder 12. Furthermore, the disadvantages of non-contact gages in the dirty and wet environment of a grinding machine have been eliminated. The result is overall higher accuracy in measuring the work piece diameter.

It is to be understood that the invention is not limited to the exact construction illustrated and described above, but that various changes and modifications may be made without departing from the spirit and scope of the invention as defined in the following claims.

I claim:

1. A gage for measuring cylindrical work pieces having a circular cross section, a generally uniform diameter and a longitudinal axis as they exit a grinding machine and move along a predetermined path of travel generally parallel to the axis of the work pieces, the gage comprising:

a pair of spaced contacts for engagement with opposite sides of the work pieces to measure the diameter of the work pieces as the work pieces move along the path of travel; and means for mounting the contacts for movement in two directions mutually orthogonal to one another and to the path of travel of the work piece to maintain engagement between the contacts and each work piece and track along the cross-section of each work piece to measure the diameter of each work piece as the work pieces move along the path of travel without the necessity of holding each work piece stationary in a fixture.

2. The gage of claim 1 wherein said path of travel is generally horizontal and wherein one of said two directions of movement has a substantial vertical vector component and the other direction of movement is substantially horizontal and normal to the path of travel.

3. The gage of claim 1 wherein said path of travel is generally horizontal and said means for mounting said contact gage includes means for rotating said gage about a horizontal first axis parallel to said path of travel and means for rotating said contact gage about a horizontal second axis normal to said path of travel.

4. The gage of claim 3 wherein said mounting means includes a fixture having a stationary portion, a second portion attached to said stationary portion for rotation about said first axis and a third portion attached to said second portion for rotation about said second axis, said gage being attached to said third portion of said fixture whereby said gage is movable in said two directions by rotation of said gage about said first and second axes.

5. The gage of claim 4 wherein said second portion of said fixture rotates about a pivot shaft defining said first axis.

6. The gage of claim 4 wherein said third portion of said fixture is attached to said second portion by at least one flexure element and said fixture further includes bias means spaced from said at least one flexure element for urging said third portion of said fixture in a predetermined direction about said second axis.

7. An apparatus for measuring cylindrical work pieces having a circular cross section, a generally uniform diameter and a longitudinal axis as they exit a thrufeed grinding machine and move from the grinding machine along a predetermined path of travel generally parallel to the axis of the work pieces, said apparatus comprising:

a gage having contacts for engagement with opposite sides of each work piece to measure the diameter of the work pieces as the work pieces move along said path of travel; and a mounting fixture for mounting said contacts at a location to engage each work piece on opposite sides to measure the work piece diameter, said fixture including means for enabling movement of said contacts in two directions mutually orthogonal to one another and to said path of travel to maintain engagement between the contacts and each work piece as each work piece moves along the path of travel.

8. The apparatus of claim 7 wherein said means for enabling movement of said contacts comprises means for rotating said contacts about a pair of axes whereby said contacts move in arcuate paths having vector components in said two directions mutually orthogonal to said path of travel.

9. The apparatus of claim 7 wherein said means for enabling movement of said gage includes a stationary first fixture portion, a second fixture portion attached to said first fixture portion for rotation about a first axis parallel to said path of travel and a third fixture portion attached to said second fixture portion for rotation about a second axis normal to said path of travel and normal to said first axis, said contacts being attached to said third fixture portion.

10. The apparatus of claim 9 wherein said third fixture portion is mounted to said second fixture portion by a pair of flexures which define said second axis.

11. An apparatus for measuring cylindrical work pieces having a circular cross section, a generally uniform diameter and a longitudinal axis as they exit a thrufeed grinding machine and move from the grinding machine along a predetermined path of travel, said apparatus comprising:

a gage having contacts for engagement with each work piece moving along said path of travel; and a mounting fixture for mounting said gage at a location to engage each work piece on opposite sides to measure the work piece diameter, said fixture including a stationary first fixture portion supporting a pivot shaft spaced above said path of travel and parallel thereto, a second fixture portion mounted to said pivot shaft for rotation about a first axis defined by said pivot shaft parallel to said path of travel and a third fixture portion attached to said second fixture portion by a pair of flexures for rotation about a second axis normal to a plane defined by said path of travel and said first axis, said contacts being attached to said third fixture portion with said contacts disposed adjacent to said path of travel.

12. The apparatus of claim 11 further comprising a V-shaped roller mounted to said third fixture portion for engagement with each work piece adjacent said contacts and bias means for urging said third fixture portion to rotate about said second axis to engage said roller with each work piece.

* * * * *